United States Patent
Zhou et al.

(10) Patent No.: US 9,946,087 B2
(45) Date of Patent: Apr. 17, 2018

(54) DIRECTIONAL BACKLIGHT STEREOSCOPIC DISPLAY DEVICE

(71) Applicant: Guangzhou Mid Technology Co., Ltd., Guangzhou (CN)

(72) Inventors: Yangui Zhou, Guangzhou (CN); Jianying Zhou, Guangzhou (CN); Hang Fan, Guangzhou (CN); Kunyang Li, Guangzhou (CN); Haiyu Chen, Guangzhou (CN); Yuman Xu, Guangzhou (CN)

(73) Assignee: Guangzhou Mid Technology Co., Ltd., Guangzhou (CN)

( * ) Notice: Subject to any disclaimer, the term of this patent is extended or adjusted under 35 U.S.C. 154(b) by 0 days.

(21) Appl. No.: 15/379,508

(22) Filed: Dec. 15, 2016

(65) Prior Publication Data
US 2018/0031852 A1   Feb. 1, 2018

(30) Foreign Application Priority Data
Jul. 27, 2016   (CN) .......................... 2016 1 0601583

(51) Int. Cl.
*G02B 27/22*   (2018.01)
(52) U.S. Cl.
CPC ................. *G02B 27/2214* (2013.01)

(58) Field of Classification Search
CPC .......... H04N 13/0497; H04N 13/0445; H04N 13/0404; H04N 13/0409; H04N 13/0418; H04N 13/0484
See application file for complete search history.

(56) References Cited

U.S. PATENT DOCUMENTS

| | | | |
|---|---|---|---|
| 2009/0315983 A1* | 12/2009 | Schwerdtner ...... | G02B 27/2214 348/59 |
| 2011/0096071 A1* | 4/2011 | Okamoto ........... | G02B 27/2214 345/419 |
| 2016/0021367 A1* | 1/2016 | Yoon ................. | H04N 13/0497 348/59 |

* cited by examiner

*Primary Examiner* — Joseph L Williams
(74) *Attorney, Agent, or Firm* — JCIPRNET

(57) ABSTRACT

A direction backlight stereoscopic display device, comprises a backlight assembly, and sequentially comprises a lens array and an image display unit along a transmitting direction of light rays emitted from the backlight assembly. The lens array includes a plurality of lens units, and the lens units are arranged along a preset curvature, forming a concave surface facing toward the image display unit. The lens array of the directional backlight stereoscopic display device according to the embodiments of the present invention is arranged as a concave surface with a definite curvature, forming an uninterrupted viewing zone distribution in a viewing region to guarantee the viewing zone a visual effect of uniformity without any dark region.

10 Claims, 3 Drawing Sheets

DIRECTIONAL BACKLIGHT STEREOSCOPIC DISPLAY DEVICE

CROSS-REFERENCE TO RELATED APPLICATIONS

This application claims the priority benefit of Chinese application serial no. 201610601583.2, filed on Jul. 27, 2016. The entirety of the above-mentioned patent application is hereby incorporated by reference herein and made a part of this specification.

FIELD OF THE INVENTION

The present invention relates to the field of image display. More particularly, the present invention relates to a directional backlight stereoscopic display device.

BACKGROUND OF THE INVENTION

Three-dimensional (3D) display (also known as stereoscopic display) is the future development direction of display technology. The stereoscopic display can provide depth information of images for eyes by mainly using a spatial-multiplexing method of parallax images. Correspondingly, a left eye image is perceived by a left eye in a left eye viewing zone while a right eye image is perceived by a right eye in a right eye viewing zone. If the left and right eye images compose a pair of parallax stereoscopic images, they can be mixed together as a 3D image by human brain to let a viewer perceive corresponding depth information.

Currently, the main trend of naked-eye 3D display technology generally includes three types: lenticular lens array, parallax barrier and directional backlight technology. In particular, a multi-view full-HD naked-eye 3D display device based on directional backlight technology includes: a light source, a lens array, and a transmissive image display unit. Light rays emitted from the light source sequentially passes through the lens array and the transmissive image display unit, and then are converged in a particular viewing zone.

As shown in FIG. 1, in the existing stereoscopic display device 100 every backlight assembly 110 comprises a plurality of backlight units 111 (in FIG. 1, 120 refers to a lens array, and 130 refers to an image display unit), and the backlight units 111 are converged at corresponding viewing zone units 141 of a viewing zone 140 to provide uniform illumination for this viewpoint. If a dark region (a non-luminous region, or luminance of the region is lower than 70% of the average luminance) exists between the backlight assembly 110, it will cause non-uniformity of screen luminance perceived by the human eyes at an edge of viewing zone unit 141 and a gap between the viewing zone units 141 (non-uniformity means that some parts of the screen are brighter while some parts are darker). Therefore, during movement, the human eyes will pass through junctions between the left and right eye viewing zones. At these junctions, even at an optimum viewing distance of a screen, the dark region on the screen will be obviously perceived by the human eyes, and the visual experience is seriously affected.

SUMMARY OF THE INVENTION

The purpose of the present invention is to provide a directional backlight stereoscopic display device for improving technical defect that a dark region exists when image is displayed.

For solving above problems, the present invention provides a direction backlight stereoscopic display device, which comprises a backlight assembly, and sequentially comprises a lens array and an image display unit along a transmitting direction of light rays emitted from the backlight assembly. The lens array includes a plurality of lens units, and the lens units are arranged along a preset curvature, forming a concave surface facing toward the image display unit.

Preferably, the lens array is separated from the image display unit by a preset distance.

Preferably, the lens array is a circular arc surface, and a center of the circular arc surface is located at a preset viewing distance.

Preferably, the lens array is one of an ellipse, a parabola, a hyperbola and even a free-form surface, or a combination thereof. A focus point and a characteristic point of curves of the lens array are located at a preset viewing distance.

Preferably, the backlight assembly comprises a plurality of backlight units, the backlight units correspond one-to-one to the lens units, and light rays emitted from the backlight units sequentially passes through the lens units corresponding to the backlight units and the image display unit, to form viewing zone units corresponding to the lens units.

Preferably, a spatial relationship between the backlight unit and the lens unit satisfies:

$$\frac{1}{L'} = \frac{1}{L} + \frac{1}{f}$$

wherein, L' is a distance between the viewing zone and a center of the lens unit, L is a distance between a light emitting surface of the backlight unit and the center of the lens unit, and f is a focus length of the lens unit.

Preferably, optical axes of the lens units are jointly converged at a center of a circular arc. An angle between the optical axis of the lens unit and a plane of the image display unit is $\theta$, an angle between the optical axis of the lens unit and a plane of the lens unit is $\eta$, and magnification of the lens unit is m, satisfying: $\eta - 90 = m(90 - \theta)$.

Preferably, after the light rays at least simultaneously emitted by three or more adjacent light emitting units pass through the lens unit, the viewing zone unit projects image by the image display unit.

Preferably, the viewing zone units corresponding to the adjacent backlight units at least partly overlap.

Preferably, the directional backlight stereoscopic display device further comprises a viewpoint detecting module and a controlling module connected with the viewpoint detecting module. The viewpoint detecting module is used to detect a moving direction of a viewpoint in a viewing zone, and the controlling module is used to control a light emitting status of a backlight unit corresponding to viewing zone units adjacent to the viewing zone unit of the viewpoint along the moving direction.

Compared with the prior art, the lens array of the directional backlight stereoscopic display device according to the embodiments of the present invention is arranged as a concave surface with a definite curvature, forming an uninterrupted viewing zone distribution in a viewing region to guarantee a visual effect of uniformity without any dark region in the viewing zone. Furthermore, a viewing angle of the stereoscopic display device of such construction could be increased. Practice shows that, the viewing angle can be increased to ±15 degrees, in which the uniformity of a stereoscopic image can be enhanced when moving laterally. Additionally, by detecting the position and moving direction of the viewpoint in real time to pre-determine and adjust the light emitting status of the backlight assembly, it is possible that the viewpoint is always maintained in the viewing zone unit of a currently projecting image of the backlight assembly during movement, and thereby allowing the human eyes to perceive uniform naked-eye 3D image during movement.

Furthermore, the industrial processing standard of the lens array having definite curvature approaches the existing processing technology, making it easy to be processed and realized, and reducing the product cost. Moreover, since the lens array with the definite curvature is separated from the image display unit by a certain distance, there is no need to incline the lens array and the image display unit for a certain angle such that interference of a moiré pattern could be avoided. Arrangement of the viewing zone being perpendicular to a horizontal direction can provide a more natural visual experience compared with the distribution of the viewing zone inclining at a certain angle.

BRIEF DESCRIPTION OF THE DRAWINGS

Specific implementations of the present invention will be further described in detail herein below in combination with the attached drawings, wherein.

In the drawings.

100: existing stereoscopic display device; 110: backlight assembly; 111: backlight unit; 120: lens array; 130: image display unit; 140: viewing zone; 141: viewing zone unit; 200: directional backlight stereoscopic display device according to the embodiments of the present invention; 210: backlight assembly; 211~214: backlight units; a~h: light emitting units; 220: lens array; 221~224: lens units; 230: image display unit; 240: viewing zone; 241~248: viewing zone units; 250: viewpoint detecting module; 260: controlling module.

DETAILED DESCRIPTION OF THE PREFERRED EMBODIMENT

Figure 1:
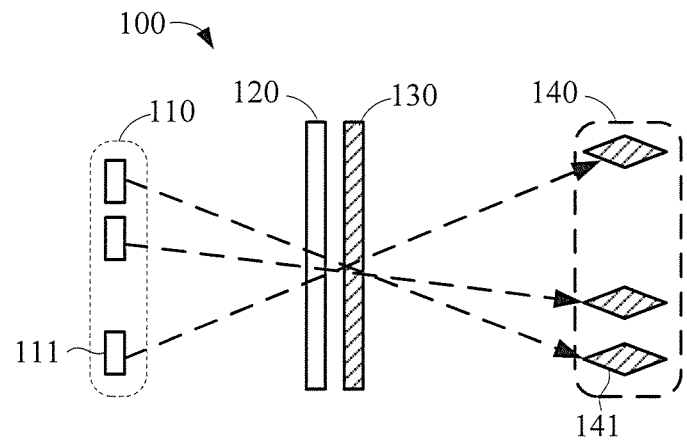
FIG. 1 is a schematic view of the existing stereoscopic display device.
Figure 2:
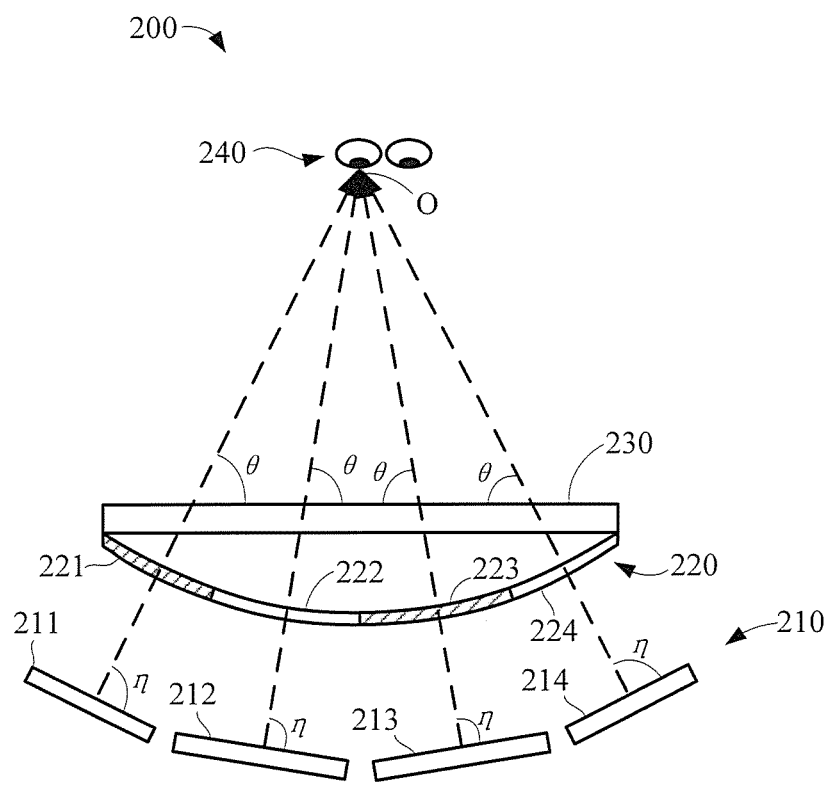
FIG. 2 is a schematic view of an implementation of the directional backlight stereoscopic display device according to the present invention.

As shown in FIG. 2, FIG. 2 is a schematic view of an implementation of the directional backlight stereoscopic display device according to the present invention. In the implementation shown in FIG. 2, a directional backlight stereoscopic display device 200 of such configuration comprises a backlight assembly 210, and sequentially comprises a lens array 220 and an image display unit 230 along a transmitting direction of light rays emitted from the backlight assembly 210. The light rays emitted from the backlight assembly 210 pass sequentially through the lens array 220 and the image display unit 230 and then form a viewing zone 240. In particular, the image display unit 230 is used for loading and refreshing parallax stereoscopic images.

The backlight assembly 210 comprises a plurality of backlight units 211~214. Light rays emitted from the backlight units sequentially passes through the lens units corresponding to the backlight units and the image display unit 230, forming viewing zone units corresponding to the lens units. Light emitting surfaces of the backlight units facing toward the lens unit 220 may be planar, as well as an arc surface with a certain curvature. The backlight units having the arc surface with the certain curvature are of high processing cost, have rigorous requirements in processing technology, and have huge difference with the existing processing technology, resulting in a low product yield rate. The present inventors found that, by using the backlight assembly 210 with planar backlight according to the embodiment of the present invention and in combination with the lens array 220 with a certain curvature, a naked-eye 3D visual effect with an uninterrupted and uniformly distributed viewing zone formed in a viewing region without dark region can be obtained. In the present embodiment, the backlight units 211~214 may be consisted of a plurality sets of close Light Emitting Diodes (LED), each LED column forming one light emitting unit of the backlight unit, and among each light emitting unit, a light emitting status may be controlled independently to satisfy the condition whereby a plurality of light emitting units are combined together as a single available viewing zone unit. There are two approaches for the backlight unit: direct type backlight or side-in type backlight.

The lens array 220 is used to converge the light energy emitted from the backlight units 211~214 of the backlight assembly 210 to the corresponding viewing zone units. In the present embodiment, the lens array 220 comprises a plurality of lens units 221~220, the lens units are arranged along a preset curvature, forming a concave surface facing toward the image display unit 230. The lens units may be manufactured by a one-time forming machining, for example, a cylindrical lens array or a linear Fresnel lens array, having characteristics of thin film optical element is suitable to fit on a curved surface arranging with the preset curvature. Thin film lens unit may be manufactured by using UV exposure process of a UV glue material, or by using a lens array made of other materials. In the present embodiment, the lens array is separated from the image display unit by a preset distance, resulting in no moiré pattern effect.

In the present embodiment, the backlight units correspond one-to-one to the lens array units, that is, each lens unit corresponds to one backlight unit. For example, in FIG. 2, the backlight unit 211 corresponds to the lens unit 221, the backlight unit 212 corresponds to the lens unit 222, the backlight unit 213 corresponds to the lens unit 223, and the backlight unit 214 corresponds to the lens unit 224. Although only backlight units 211~214 and lens units 221~224 are illustrated in FIG. 2, the present application is not limited thereto, and a person skilled in the art may set any other number of backlight units and lens units.

The lens array 220 is a circular arc surface, and a center of the circular arc surface is located at a preset viewing distance. A relative angle between the backlight unit and the corresponding lens unit is conducted with an optical correction to some extent according to their different relative position on an arc, such that the viewing zone at an optimum position whereby light is converged is more concentrated and uniform after emission from the backlight assembly and transmission through the lens unit. As shown in FIG. 2, the lens units 221~224 are arranged along a circular arc, and optical axes of the lens units are jointly converged at a center O of the circular arc. The center O of the circular arc is located at an optimum 3D viewing distance of the stereoscopic display device 200 and at a central vertical line of the image display unit 230. In general, taking lens unit 221 as example, centers of lens unit 221 and backlight unit 211 and center O of the circular arc are located on one common line. An angle between the optical axis of lens unit 221 and a plane of image display unit 230 is θ, and the optical axis of lens unit 221 intersects with the center of backlight unit 211 with an angle of η. Supposing that a magnification of the lens unit 221 is m, then the optical correction satisfies:

$$\eta - 90 = m(90 - \theta) \quad (1)$$

In the process of achieving the present implementation, the inventors found that, satisfying formula (1) can effectively increase the optical energy concentration in the viewing zone and enhance the visual image uniformity. The relationships between lens units 222~224 and backlight units 212~214 are same as formula (1), which will note described in detail herein.

In some of the other embodiments, the lens array 220 may be one of an ellipse, a parabola, a hyperbola, and even a free-form surface, or a combination thereof. A focus point and a characteristic point of curves of the lens array 220 are set at the preset viewing distance.

Additionally, a spatial relationship between the backlight unit and the lens unit is determined by Gaussian Method. In particular, the spatial relationship between the backlight unit and the lens unit which is determined by Gaussian Method satisfies the following relation:

$$\frac{1}{L'} = \frac{1}{L} + \frac{1}{f} \quad (2)$$

wherein, L' is the distance between the viewing zone and a center of the lens unit, L is the distance between the light emitting surface of the backlight unit and the center of the lens unit, and f is a focus length of the lens unit. In particular, the lens unit that formula (2) refers to is the one that corresponds to the backlight unit, and the viewing zone unit is the unit whereby light is converged after the light emitted from the backlight unit sequentially passes through the lens unit and image display unit.

After light rays at least simultaneously emitted by three or more adjacent light emitting units pass through the lens units, the viewing zone unit projects image by the image display unit 230. In particular, the viewing zone units corresponding to the adjacent backlight units at least overlap partly to improve the dark region effect and enhance displaying uniformity.

In the present embodiment, the viewing zones at a center of the stereoscopic display device 200 are formed by the backlight units corresponding to each of the optical axes of lens units. Therefore, the optical energy concentration here can effectively avoid the off-axis aberrations of the lens units, making higher concentration ratio of the optical energy in the viewing zone, hence a higher uniformity and lower crosstalk rate can be presented. In addition, since the angle of the backlight units subtended at the center of the lens unit is a field angle of concentration, and the field angles between different lens units and backlight units are of same value, hence after curved arrangement of the lens units, visual angle of the viewing zone along the optimum viewing distance can be increased. Therefore, another advantage of the present invention is that the imaging space within a small field of the lens unit is used to achieve a larger field of viewing range of the stereoscopic display device. Finally, because there is a certain distance between lens units and image display unit 230, when both the image display unit 230 and lens units comprise periodic structure, a moiré pattern will not occur even if they are relatively not inclined.

Figure 3:
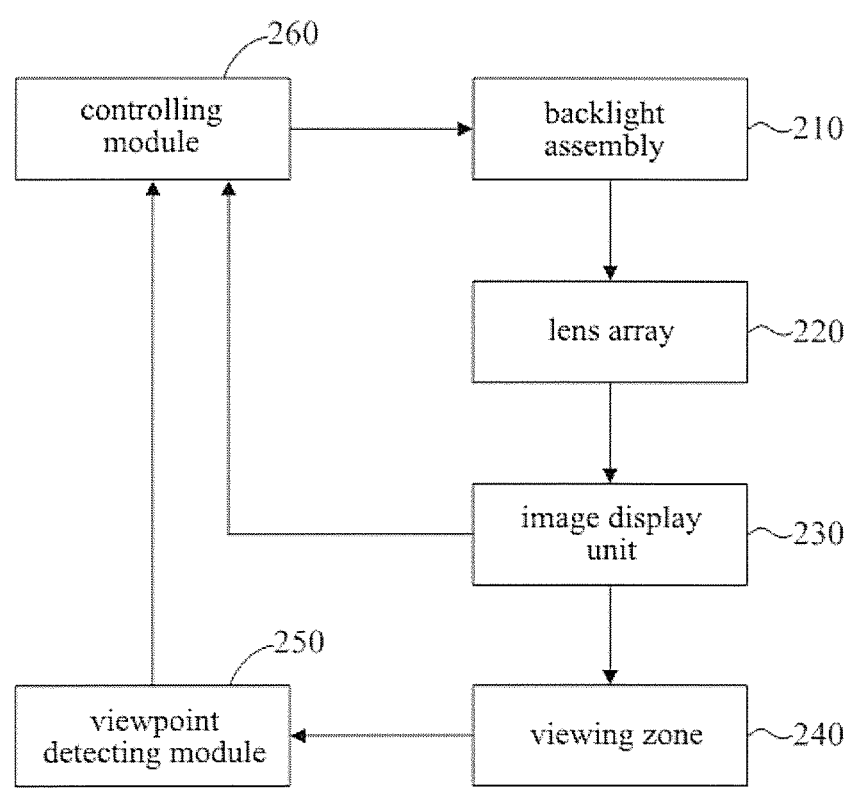
FIG. 3 is a schematic view of another implementation of the directional backlight stereoscopic display device according to the present invention.

With reference to FIG. 3, FIG. 3 is a schematic view of another implementation of the directional backlight stereoscopic display device according to the present invention. Based on the implementation illustrated by FIG. 2, in the implementation shown in FIG. 3, the directional backlight stereoscopic display device 200 further comprises a viewpoint detecting module 250 and a controlling module which is connected with the viewpoint detecting module 250.

The viewpoint detecting module 250 is used to detect a moving direction of a viewpoint in the viewing zone. The controlling module 260 is used to control the light emitting status of the backlight unit corresponding to the viewing zone unit that is adjacent to the viewing zone unit of this viewpoint along the moving direction.

When the human eyes are focused in the uninterrupted viewing zone, by detecting eye positions with the viewpoint detecting module 250, information of the eye positions is feedback to the controlling module 260. In combination with refreshing information of parallax images transferred by the image display unit 230, by controlling the light emitting status of the light emitting units corresponding to the viewing zone unit where the eyes focuses, the naked-eye 3D display effect is provided.

Figure 4:
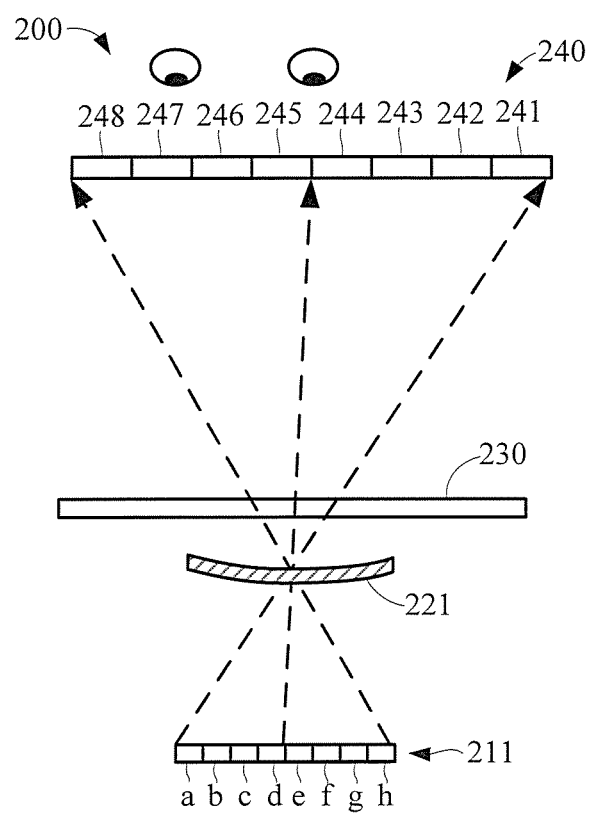
FIG. 4 is a schematic view of adjusting the light emitting status of the backlight unit according to the movement of the viewpoint in the viewing zone in the implementation shown in FIG. 3.

With reference to FIG. 4, FIG. 4 is a schematic view of adjusting the light emitting status of the backlight unit according to the movement of the viewpoint in the viewing zone in the implementation shown in FIG. 3. FIG. 4 illustrates a method of the stereoscopic display device for achieving naked-eye 3D display with uniformity and without dark region by combining the backlight unit with the corresponding lens unit. With reference to FIG. 4, 230 is the image display unit, 221 is one lens unit of the lens array arrangement, 211 is the backlight unit corresponding to lens unit 221, 240 is the viewing zone at the optimum position that light is converged after emission from the backlight unit 211 and transmission through the lens unit 221. The backlight unit 211 is consisted of a plurality of light emitting units a~h. In the present invention, each of the light emitting units a~h provides lighting by a column of LED, and a light is emitted after being uniformed by an optical diffusion sheet of the backlight unit 211 that is arranged towards a surface of the lens unit 220. The light emitting status of each light emitting unit in the backlight unit 211 is controlled by the controlling module 260, which can control any of the light emitting units turning on and off in accordance with requirements. In the implementation shown in FIG. 4, the backlight unit 211 comprises the light emitting units a~h. In particular, the viewing zone units 241~248 in the viewing zone 240 are formed by the transmittance from the light emitting units a~h in the backlight unit 211 through lens unit at the viewing distance. In practice, one viewing zone unit is formed by simultaneously turning on two or more light emitting units.

Below, two light emitting units corresponding to one viewing zone unit is taken as an example to explain the working process of the stereoscopic display device according to the embodiment of the present invention.

When the viewpoint detecting module 250 detects the right human eye focusing at the viewing zone units 241 and 242 while the left eye focusing at the viewing zone units 244 and 245, light emitting units a & b and d & e are controlled and turned on by the controlling module 260, wherein the time sequence for turning on or off the light emitting units is determined by the time sequence of refreshing the left and right parallax images by the image display unit. When image display unit 230 refreshes left eye image, light emitting units d & e are turned on while light emitting units a & b are turned off; and the opposite is performed when refreshing the right eye image. Usually, there will be no flicker sensation when the refreshing ratio of left and right eye image is above 120 Hz. Meanwhile, light emitting unit c is controlled by the controlling module 260 to be in a turned off state, or in a state of luminance being below 50% of the light emitting units a & b and light emitting units d & e, controlling the crosstalk rate of the left and right eyes caused by left and right light sources to be below 5%. When the right eye moves towards the left until the edges of viewing zone units 242 and 243, the viewpoint detecting module 250 will feedback movement information of the viewpoint (for example, human eye) to the controlling module 260, and then the controlling module 260 correspondingly turns off light emitting unit a, turns on light emitting unit c and f, and controls the luminance of light emitting unit d to be completely dark or below 50% as compared to the others; meanwhile the screen refreshing synchronous action is repeated as done previously, so as to ensure that the human eye perceives uniform and uninterrupted naked-eye 3D images when the eyes are moving.

Although implementations of the present invention have been described above in detail in combination with the attached drawings, the above-described implementations could not be interpreted as limitation to the present invention. Various modifications can be made by those skilled in the art within their knowledge without departing from the spirit and scope of the present invention. For example, the structure of the light emitting units of the backlight units in the embodiments is not limited to a planar arrangement, and the light emitting units may also form a stereoscopic arrangement.

What is claimed:

1. A directional backlight stereoscopic display device, comprising:
   a backlight assembly comprising a plurality of backlight units;
   an image display unit;
   a lens array disposed between the backlight assembly and the image display unit to divide the backlight units to two groups respectively corresponding to left eye and right eye of a viewer, wherein the lens array comprises a plurality of lens units arranged along a preset curvature forming a concave surface facing the image display unit, so that a continuous viewing region without moiré pattern or dark zones can be provided to the viewer.

2. The directional backlight stereoscopic display device according to claim 1, wherein the lens array is separated from the image display unit by a preset distance.

3. The directional backlight stereoscopic display device according to claim 1, wherein the lens array is a circular arc surface and a center of the circular arc surface is located at a preset viewing distance.

4. The directional backlight stereoscopic display device according to claim 1, wherein the lens array is one of an ellipse, a parabola, a hyperbola, and even a free-form surface, or a combination thereof, and a focus point and a characteristic point of curves of the lens array are located at a preset viewing distance.

5. The directional backlight stereoscopic display device according to claim 1, wherein the backlight assembly comprises a plurality of backlight units, the backlight units corresponding one-to-one to the lens units, and the light rays emitted from the backlight units sequentially passes through the lens units corresponding to the backlight units and the image display unit, to form viewing zone units corresponding to the lens units.

6. The directional backlight stereoscopic display device according to claim 5, wherein a spatial relationship between the backlight unit and the lens unit satisfies:

$$\frac{1}{L'} = \frac{1}{L} + \frac{1}{f}$$

wherein, L' is a distance between the viewing zone unit and a center of the lens unit, L is a distance between a light emitting surface of the backlight unit and the center of the lens unit, and f is a focus length of the lens unit.

7. The directional backlight stereoscopic display device according to claim 5, wherein optical axes of the lens units are jointly converged at a center of a circular arc, an angle between the optical axis of the lens unit and a plane of the image display unit being θ, an angle between the optical axis of the lens unit and a plane of the lens unit being η, and magnification of the lens unit being m, satisfying: η−90=m (90−θ).

8. The directional backlight stereoscopic display device according to claim 6, wherein after the light rays at least simultaneously emitted by three or more adjacent light emitting units pass through the lens unit, the viewing zone unit projects image by the image display unit.

9. The directional backlight stereoscopic display device according to claim 5, wherein the viewing zone units corresponding to the adjacent backlight units at least partly overlap.

10. The directional backlight stereoscopic display device according to claim 1, wherein the directional backlight stereoscopic display device further comprises a viewpoint detecting module and a controlling module connected to the viewpoint detecting module, the viewpoint detecting module being used to detect a moving direction of a viewpoint in a viewing zone, and the controlling module being used to control a light emitting status of a backlight unit corresponding to viewing zone units adjacent to the viewing zone unit of the viewpoint along the moving direction.

* * * * *